United States Patent [19]

Lebecque

[11] 4,260,272

[45] Apr. 7, 1981

[54] PROCESSOR AND DISPENSER

[75] Inventor: Maurice G. N. G. Lebecque, Burnaby, Canada

[73] Assignee: Irene E. M. Lebecque, Burnaby, Canada

[21] Appl. No.: 86,230

[22] Filed: Oct. 18, 1979

[51] Int. Cl.³ .............................................. B05C 17/00
[52] U.S. Cl. ........................................ 401/4; 118/25;
366/137; 366/186; 366/188; 366/195; 401/143;
401/266; 401/289
[58] Field of Search ............................ 118/18, 24, 25;
366/223, 224, 186, 188, 195, 137; 401/9, 27, 10,
139, 11, 143, 18, 266, 26, 289, 4; 99/516; 425/97

[56] References Cited

U.S. PATENT DOCUMENTS

| | | | |
|---|---|---|---|
| 1,547,937 | 7/1925 | Miller | 118/259 |
| 1,980,216 | 11/1934 | Merritt | 366/223 X |
| 2,481,242 | 9/1949 | Reget | 118/24 |
| 2,804,767 | 9/1957 | Schoen | 401/9 |
| 3,090,071 | 5/1963 | Brody | 401/266 |
| 3,126,574 | 3/1964 | Fox | 118/411 X |

*Primary Examiner*—John P. McIntosh
*Attorney, Agent, or Firm*—Townsend and Townsend

[57] ABSTRACT

A processing device comprises a base member with inner and outer concentric tubular shafts extending vertically upwards therefrom. There is means for rotating the shafts in opposite directions. A container mounted on the base is connectable to the outer shaft for rotation therewith. An impeller within the container is connected to the inner shaft for rotation therewith. There is a valve for controlling the flow of material through an aperture of the impeller member and an aperture of the inner shaft and downwardly through the inner shaft. A dispensing device comprises a distributing head with a fitting for connecting the device to a hose for supplying a paste-like substance under pressure, a spreading edge and a plurality of conduits extending from the fitting, through the distributing head and opening outwardly adjacent the spreading edge.

11 Claims, 10 Drawing Figures

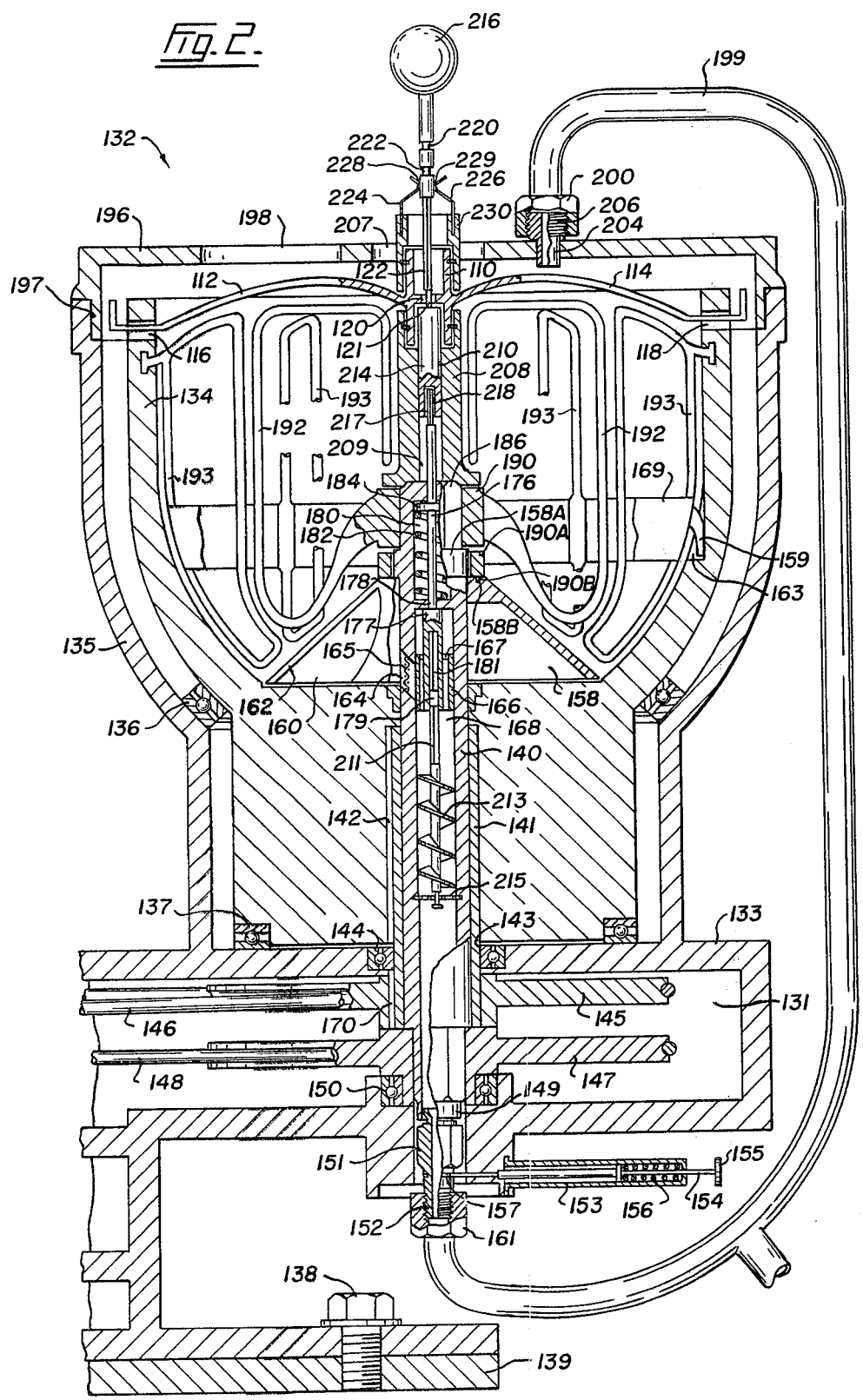

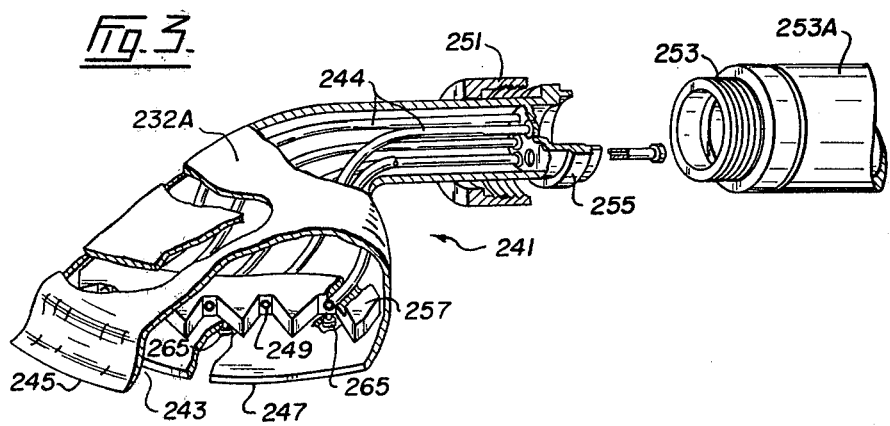
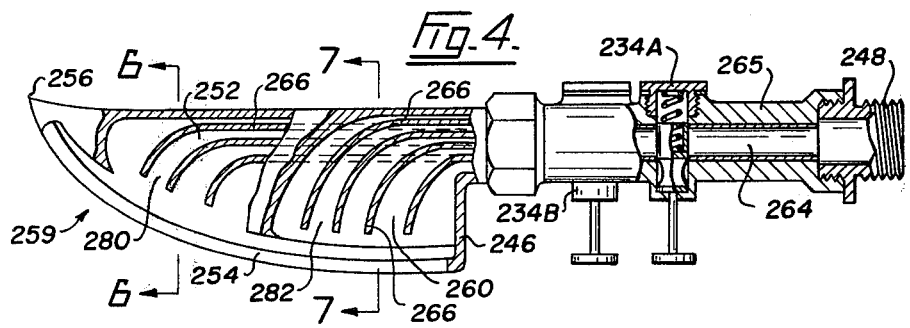
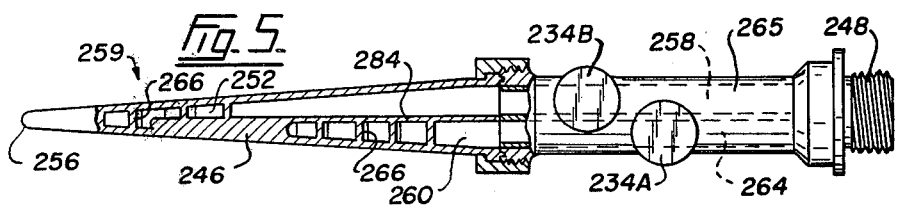
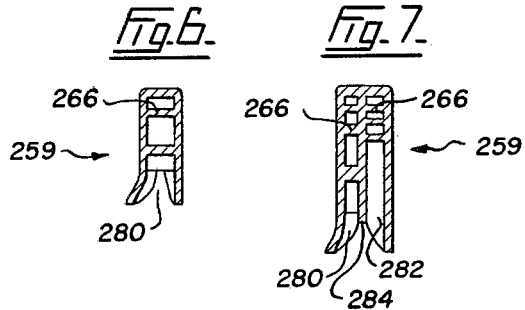

PROCESSOR AND DISPENSER

BACKGROUND OF THE INVENTION

This invention relates to a processor and dispenser.

Food processing appliances for performing such functions as chopping, slicing, beating and whipping foods are well known. Mechanical vegetable peelers where the vegetables are circulated in water against abrasive surfaces are also well known.

The prior art does not reveal a highly flexible device useful, for example, in the processing and dispensing of food or other substances and which can be employed for such diverse purposes as peeling vegetables, chopping vegetables, buttering bread, icing cakes, or even spreading plaster.

SUMMARY OF THE INVENTION

According to a first aspect of the invention, a processing device comprises a base member with inner and outer concentric tubular shafts extending vertically upwards from the base member. There is means for rotating the shafts in opposite directions. A container is mounted on the base and is connectable to the outer shaft for rotation therewith. An impeller member within the container is connected to the inner shaft for rotation therewith. The impeller member and the inner shaft have adjacent apertures so the inside of the container communicates with the inside of the inner shaft. There is valve means for controlling the flow of material through the apertures of the impeller member and the inner shaft and downwardly through the inner shaft.

According to a second aspect of the invention, a dispensing device for paste-like substances comprises a distributing head with a fitting for connecting the device to a hose for supplying the substance under pressure, a spreading edge and a plurality of conduits extending from the fitting, through the distributing head and opening outwardly adjacent the spreading edge.

A processor and dispenser according to the invention would be useful in food-related industries such as bakeries and restaurants for the processing of foods and for dispensing and spreading paste-like foods such as butter or margarine. Smaller versions of the device would be suitable for household purposes. However, the invention is not restricted to use with foods; it would be useful for processing such substances as drugs, wood fibres and paints as well as distributing and processing plasters, stuccos and mortar for bricklayers.

The device could be portable, anchored onto the floor or anchored onto a truck box or another vehicle. The unit could have its own wheels and pulled by hand or by a motorized vehicle.

The electrical power for the device could be provided by a normal household socket, by its own electrical generator or from a pulling vehicle's electrical supply.

In the drawings which illustrate embodiments of the invention:

FIG. 2 is a sectional view of the processing device of FIG. 1, shown in elevation;

FIG. 3 is an isometric view, partly broken away, showing a dispensing device for spreading paste-like substances including a tube-type dispensing system;

FIG. 4 is an elevational view, partly broken away, of a knife for spreading a paste-like substance;

FIG. 5 is a plan view, partly broken away, of the knife of FIG. 4;

FIG. 6 is and 7 are sectional views of the knife of FIG. 4;

DESCRIPTION OF THE PREFERRED EMBODIMENTS

Figure 1:
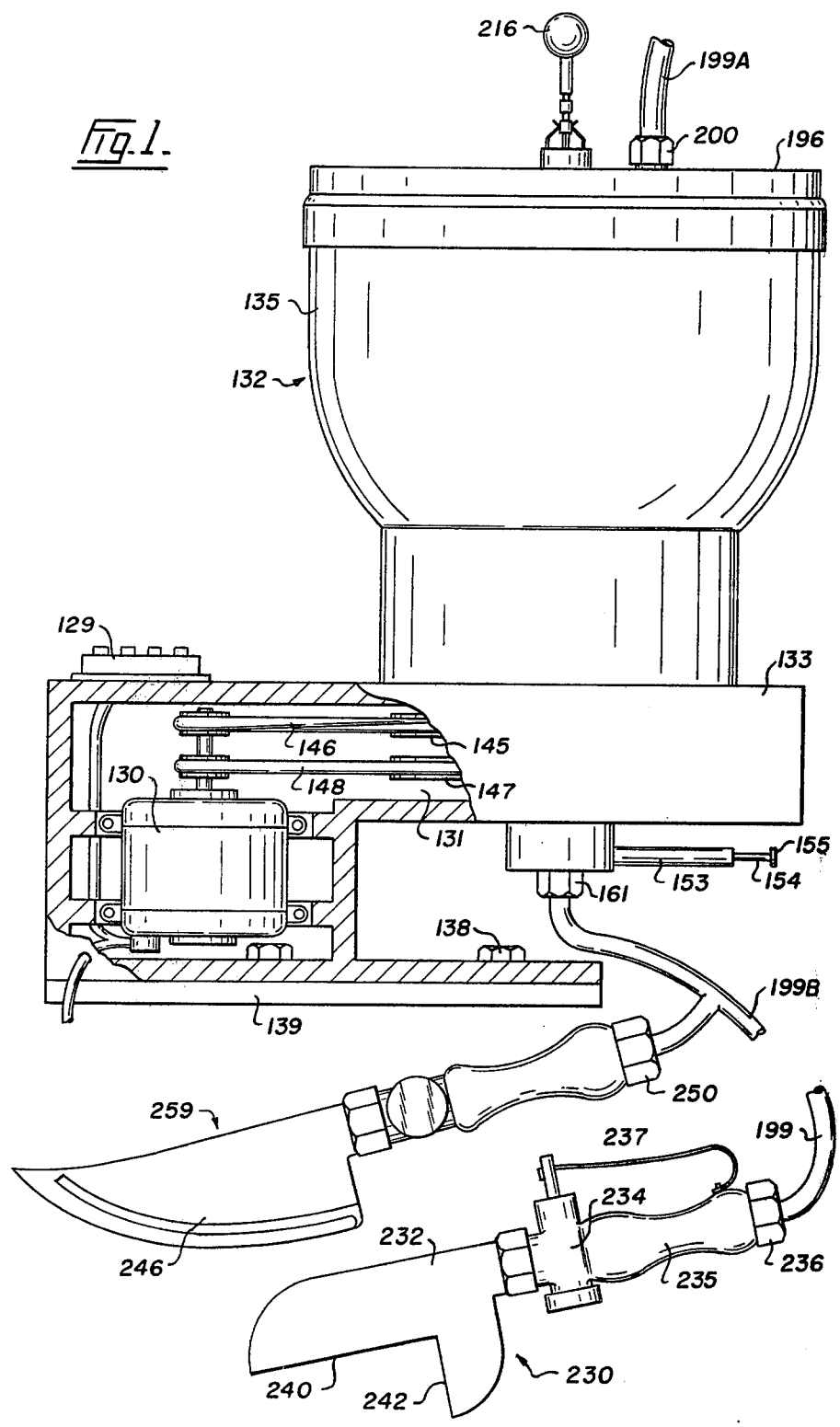
FIG. 1 is an elevational view, partly broken away, of a processing and dispensing device according to an embodiment of the invention.

Referring firstly to FIGS. 1 and 2, the processor 132 has a base member 133. A container or bowl 134 is rotatably received within an outer bowl 135 by means of ball bearings 136 and 137. Outer bowl 135 is mounted on base 133. A bolt 138 is provided for securing processor 132 to a surface 139.

Processor 132 has a rotatable inner shaft 140 and a rotatable outer shaft 141. Shaft 141 is connected to bowl 134 by a keyway 142 for rotating the bowl. Shaft 140 is rotatable within shaft 141 and extends upwardly therefrom. Shaft 141 extends downwardly into internal chamber 131 of base 133 through aperture 143 and is rotatably supported by ball bearing 144 therein. A sheave 145 is connected to shaft 141 by a keyway 170 and a crossed drive belt 146 connects the sheave to an electric motor 130 which provides means for rotating shaft 141 in one direction. Shaft 140 is connected to a lower sheave 147 connected to the same electric motor 130 by an uncrossed drive belt 148. Sheave 147 is rotatably mounted on ball bearing 150. Since belt 146 is crossed and belt 148 is uncrossed, shafts 140 and 141 are rotated in opposite directions by the electric motor. Push button controls 129 provide variable speed control for motor 130.

The lower end 149 of shaft 140 is rotatably connected to a threaded fitting 151. The lower threaded portion 152 of fitting 151 projects below the base member 133 and permits a female hose fitting 161 to be connected thereto.

A pin 154 with a handle 155 is slidably received within horizontal tube 153 and is resiliently biased by coil spring 156. The end of pin 154 engages recess 157 of fitting 151.

An impeller 158, which is shaped like a truncated cone, is connected to shaft 140 within the bowl 134. An aperture 160 adjacent blade 162 of impeller 158 communicates with aperture 164 in the side of shaft 140. A filter screen 165 covers aperture 164. A cylindrical member or valve insert 166 is vertically slidable within the central hollow 168 in shaft 140. Insert 166 has an annular aperture 167 extending vertically therethrough. A stem 177 is connected to insert 166 and is connected upwardly with stem 176. Stem 176 extends slidably through apertures 178 and 179 and cylindrical chamber 180 of shaft 140. A coil spring 182 is compressed between the bottom of the chamber 180 and flange 184 connected to stem 176.

A keyed shaft 211, fitted with an auger 213, extends downwardly from the central aperture 179 of insert 166. The upper portion 181 of the aperture 179 has a keyway for engaging with the shaft 211 when the insert 166 is moved downwardly. A lower bearing support 215 is provided within the shaft 140 for shaft 211.

Figure 8:
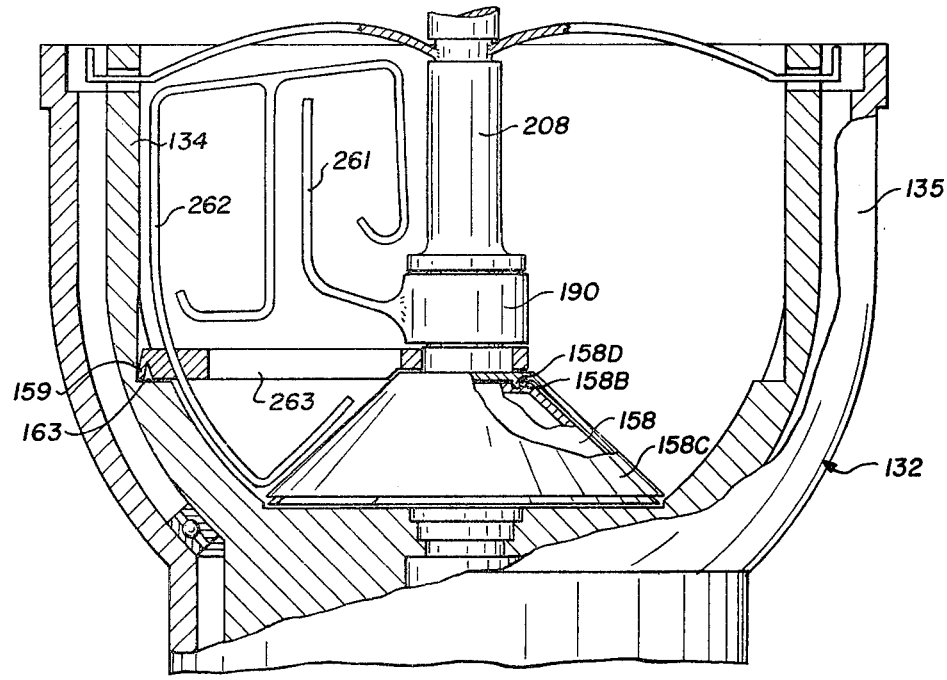
FIG. 8 is an elevational view, partly broken away, of a dough or paste mixer according to another embodiment of the invention.
Figure 9:
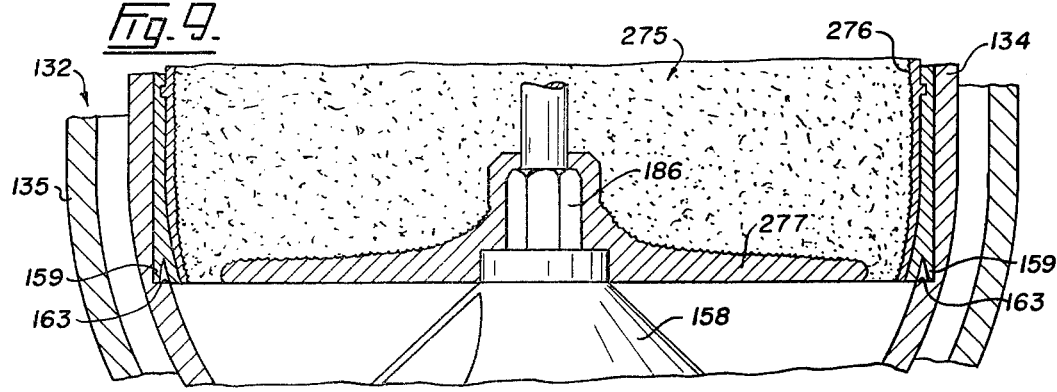
FIG. 9 is a sectional view of a vegetable peeler according to the invention.
Figure 10:
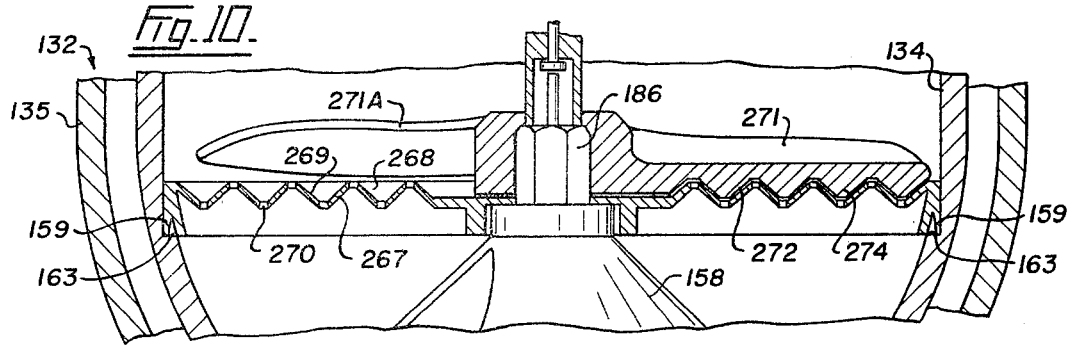
FIG. 10 is a sectional view of a food processor, according to the invention, comprising a mechanical sieve.

Processor 132 is adapted to receive various processing accessories within the bowl 134. For example, as shown in FIG. 2, the upper hexagonal portion 186 of shaft 140 is adapted to receive the hexagonal socket 190 to which is attached a plurality of beaters 192. A ring 190A is fitted below socket 190 over cylindrical portion 158A of shaft 140. A pin 190B is fitted within a corresponding aperture 158B of impeller 158. A plurality of complementary beaters 193 are connected together by band 169 and connected to the rotating bowl 134 by resilient pins 159 which fit within slots 163 of the bowl. Pins 159 are compressed when beaters 193 are fitted to bowl 134. There is, or could be, the same number of beaters 192 and 193. As shown in FIG. 2, there could be only one pin 159 and one slot 163, but FIGS. 8, 9 and 10 illustrate that there could be a plurality of slots 163 and pins 159 and there can be more slots than pins.

Bowl 134 is provided with a lid 196 which is disc-shaped and fitted tightly within a circular recess 197 of the outer bowl 135. Lid 196 has a plurality of openings 198 for feeding material into the bowl and is fitted with a spout 204. The upper male threaded portion 206 of spout 204 is adapted to connect to the female hose fitting 200 of hose 199 for feeding material into the bowl.

A shaft 208 has an upper portion 203 extending rotatably through aperture 207 at the center of lid 196 and has a longitudinal central aperture 210 extending to the bottom 209 thereof. Bottom 209 rests on the upper portion 186 of shaft 140 and socket 190 of beaters 192. A stem 214 extends slidably through aperture 210 and has a knob 216 at the top thereof. A slot 218 at the bottom of stem 214 receives the flat, blade-like top 217 of stem 176. A pair of vertically spaced-apart grooves 220 and 222 extend about stem 214 above the lid 196. A pair of leaf springs 224 and 226 are connected to the top of shaft 208 and have points 228 and 229 resiliently biased against stem 214 to engage with either groove 220 or groove 222. A support member 110 rotatably connects the upper portion 203 and the rest of shaft 208 and has a pair of support arms 112 and 114 which engage with slots 116 and 118 of bowl 134. Support member 110 has a central aperture 120 with a keyway. When knob 216 is raised, as shown, the smaller diameter portion 121 of stem 214 is adjacent the corresponding keyway of aperture 120 so member 110 does not rotate stems 214 and 176 and insert 166.

During operation of processor 132, liquid material can be added through spout 204 from hose 199A, shown in FIG. 1, while more bulky material can be placed in the bowl through apertures 198 of lid 196. Sheaves 145 and 147 are then rotated in opposite directions by belts 146 and 148 and electric motor 130. This rotates shaft 140, impeller 158 and beaters 192 in one direction and shaft 141, beaters 193 and bowl 134 in the opposite direction.

In order to discharge a liquid or a paste-like substance downwardly through the inner shaft 140, it is simply necessary to depress knob 216 downwardly. This moves keyed portion 122 of shaft 214 into engagement with the keyway of aperture 120 in support member 110 so that bowl 134 rotates stems 214 and 176. When knob 216 is depressed so springs 224 and 226 engage groove 222, insert 166 is moved downwardly clear of aperture 164 so that material can flow through filter 165 and downwardly through annular aperture 167 of the insert. When knob 216 is depressed so springs 224 and 226 engage with groove 220, the upper keyway portion 181 of aperture 179 engages with shaft 211 to rotate auger 213. Auger 213 helps move the material through filter 165 in aperture 164 and downwardly through shaft 140 to threading fitting 151.

Other accessories may also be used with processor 132. For example, FIG. 8 shows a dough or paste mixer 132 with an inner hook 261 connected to socket 190 and thereby operatively connected to outer shaft 141. An outer hook 262 is connected to paddle 263 which is fitted within one of the grooves 163. For this embodiment, a conical cover 158C is fitted over impeller 158 to block aperture 160 and has a pin 158D for fitting in the aperture 158B of impeller 158. Cover 158C is considered as an accessory. Neither the valve operated by knob 216 of FIG. 2, nor the distributing devices described below are utilized with the embodiment of FIG. 8. The dough or paste products are removed from the top of the processor.

FIG. 10 shows a mechanical seave consisting of a disc 267 received in the grooves 163 of bowl 134 near the bottom thereof. The disc 267 has a plurality of concentric circular grooves 268 extending about its top surface 269. A plurality of apertures 270 extend through the disc from the top surface towards the impeller 158. An impeller 271A and a blade 271 extend radially from the inner shaft 140 above the disc. The lower surface 272 of blade 271 has a plurality of pointed downward projections 274. Each of the projections 274 is slidably received within one of the grooves 268 for movement through the grooves as the blade is rotated by shaft 140. Blade 271 forces the food through the apertures 270 of disc 267 to produce a puree, while impeller 271A stirs the food.

FIG. 9 shows vegetable peeler 275 comprising another attachment for a food processor 132. In this case, water is added through hose 199A and spout 204, as shown in FIG. 1, by attaching the hose to a water supply. Handle 216 is then depressed so that water containing the peelings from the vegetables can be discharged downwardly through the inner shaft 140 and then through a hose connected to fitting 151. The peeler 275 has a rough lining 276 fitted within the grooves 163 of bowl 134 and a rough disc 277 connected to the hexagonal portion 186 of the shaft 140. The disc 277 extends across the bowl 134 near the bottom of rough lining 276. The bowl 134 is filled with water and the potatoes or other vegetables to be peeled. The bowl 134 is rotated in one direction while the disc 277 is rotated by shaft 140 in the opposite direction. The potatoes or other vegetables are scraped on the lining and the disc and the peelings are removed.

Devices for distributing paste-like substances are shown in FIG. 1 and FIGS. 3 to 7. These distributing devices may comprise attachments for processor 132. One such device is the cake icer 230 shown in FIG. 1. The cake icer has a distributing head 232 and a handle 235 with a male fitting for connecting to the female fitting 236 of hose 199B. The other end of the hose 199B is connected to a supply of paste-like material under pressure. For example, it may be connected to the fitting 151 of processor 132. Distributing head 232 has a horizontal spreading edge 240 for the top of a cake and a vertical spreading edge 242 for the sides of the cake. A valve 234 controls the flow of material through distributing head 232. Leaf spring 237 is depressed by the hand to open valve 234 and allow material to flow from handle 235 and through internal conduits of distributing head 232 to apertures adjacent spreading edges 240 and 242. The bowl 134 of processor 132 can be filled with icing and the knob 216 depressed. The icing is fed downwardly through inner shaft 140 and through hose 199B to icer 230. If desired, excess icing from the distributing device can be recirculated upwardly to spout 204 by a hose 199 as shown in FIG. 2.

FIG. 3 shows another distributing device 241 with a tube-type distributing system. In this case, the distributing head 232A has a forward curved spreading edge 245 separated from the lower flat spreading surface 247 by the curved aperture 243. The female fitting 251 is adapted to connect distributing head 232A to the male fitting 253 of handle 235A. A plurality of tubes 244 are connected to fitting 255 which is connected to handle 235A by fitting 251. The tubes 244 have open ends 249 at terminal 257 within the aperture 243 and above the spreading surface 247. As shown, terminal 257 is screwed in place by screws 265 and squeezed between the top and bottom of distributing head 232A.

FIGS. 1, 4 and 5 show a knife 259 for spreading a paste-like substance. In this case, the distributor head comprises the blade 246 of the knife. A male fitting 248 is provided for connecting the knife to the fitting 250 of the hose 199B supplying the paste-like substance. The conduits 252, which open adjacent the edge 254 of the blade near the tip 256, communicate with the fitting 248 through the chamber 258 of handle 265, as shown in FIG. 5. Valve 234B controls the flow of material to conduits 252. When depressed, material can flow past valve 234B through chamber 258 and is discharged through orifice 280 as shown in FIGS. 6 and 7. The conduits 260 distal the tip 256 communicate with the fitting through the chamber 264. Valve 234A, similar to valve 234B, is provided to control the flow of material to conduits 260. Conduits 252 and 260 are separated by a plurality of dividing walls 266. Valve 234 permits material to be discharged through orifice 282, shown in FIG. 7, when depressed.

The knife 259 is suitable for spreading, for example, butter or mayonnaise. The appropriate food is placed in bowl 134 of processor 132 with the hose 199B connecting fitting 161 of the processor to the fitting 248 of the knife 259. When the shafts 140 and 141 of the processor are rotated by the electric motor and the knob 216 is depressed, the substance within bowl 134 passes through the hose and is discharged through conduits 252 and 260 of the knife. The knife is used to spread the butter, margarine or mayonnaise while the appropriate substance is being discharged. FIG. 6 shows the single discharge orifice 280 of the forward portion of knife 259 and FIG. 7 shows the two discharge orifices 280 and 282 of the back portion of the knife which are separated by dividing wall 284.

When compared with the prior art, the processors of FIGS. 1, 2, 8, 9 and 10 offer particular advantages. For example, these appliances are gearless and are adapted to empty themselves through the hollow inner shaft 140. The rotational speed is reduced when compared with a conventional mixer because of the rotation of inner bowl 134. The peeler of FIG. 9 requires no centrifugal force like other vegetable peelers.

What I claim is:

1. A processor comprising:
    a base member;
    inner and outer concentric tubular shafts extending vertically upwards from the base member;
    means for rotating the shafts in opposite directions;
    a container mounted on the base and connectable to the outer shaft for rotation therewith;
    an impeller member within the container and connected to the inner shaft for rotation therewith, the impeller member and the inner shaft having adjacent apertures so the inside of the container communicates with the inside of the inner shaft; and
    valve means for controlling the flow of material through the apertures of the impeller member and inner shaft and downwardly through the inner shaft.

2. A processor as claimed in claim 1, the valve means extending upwardly to the top of the container and having a cylindrical member vertically slidable within the inner shaft adjacent the aperture thereof to control the flow of material into the inner shaft.

3. A processor as claimed in claim 2, comprising an auger within the inner shaft and connectable to the container for rotation therewith.

4. A processor as claimed in claim 3, comprising a hose fitting at the bottom of the inner shaft for discharging material from the processor.

5. A processor as claimed in claim 4, the container comprising an inner container rotatably received within an outer container connected to the base member, the processor comprising a lid for the outer container.

6. A processor as claimed in claim 1, comprising a beater connected to the inner shaft near the top of the impeller member.

7. A processor as claimed in claim 1, comprising a first beater connected to the inner shaft near the top of the impeller member and a second beater connected to the inner container for rotation therewith.

8. A combination of the processor as claimed in claim 1 and a device for spreading paste-like substances comprising:
    a distributing head with a fitting for connecting the spreading device to a hose for supplying a paste-like substance under pressure, a spreading edge and a plurality of conduits extending from the fitting, through the distributing head and opening outwardly adjacent the spreading edge, the hose being connected to the inner shaft of the processor near the bottom thereof.

9. A combination as claimed in claim 8 comprising a hose connecting the distributing head to the top of the container for recirculating excess paste-like substance into the container from the device for spreading.

10. A processor as claimed in claim 1 comprising grooves in the container for receiving attachments rotatable with the bowl.

11. A device as claimed in claim 1 adapted for mixing dough or paste products and comprising:
    a cover for the impeller to block the aperture thereof;
    an inner hook connected operatively to the inner shaft; and
    an outer hook connected to the container.

* * * * *